United States Patent [19]

Fioravanti

[11] Patent Number: 4,838,981
[45] Date of Patent: Jun. 13, 1989

[54] DEVICE FOR SEALING ENVELOPES MADE OF PLASTIC

[75] Inventor: Pietro Fioravanti, Schio, Italy
[73] Assignee: P.F.M. S.p.a., Vicenza, Italy
[21] Appl. No.: 189,235
[22] Filed: May 2, 1988

[30] Foreign Application Priority Data

May 7, 1987 [IT] Italy .................. 85542 A/87

[51] Int. Cl.⁴ .................................. B32B 31/18
[52] U.S. Cl. .................. 156/515; 156/251; 156/518; 156/530
[58] Field of Search ........... 156/251, 515, 518, 530, 156/583.4; 493/199, 200, 203, 205, 206, 208

[56] References Cited

U.S. PATENT DOCUMENTS 3,415,704 12/1968 Bate .................. 156/515
3,740,300 6/1975 Heinzer .................. 156/583.4
4,048,003 9/1977 Bolli .................. 156/515
4,120,235 10/1978 Beck et al. .................. 156/515

Primary Examiner—Caleb Weston
Attorney, Agent, or Firm—Bucknam and Archer

[57] ABSTRACT

The device comprises two paddles (1), each one of the paddles being fixed to a bar (3), the ends of which are located within a cam path (8) formed on the surface turned towards the working zone of support (18) located corresponding to both the lateral heads of the device. The motion of the bars (3) and obviously also of the paddles (1) along the cam path (8) which presents a rectilinear working section (8') and a portion of a circular section (8"), is determined for each bar by a pair of rods (7), each rod having a slot (7'). Two sections of the bars close to their extremities are placed within the slot (7') and all four rods rotate synchronously, the bars placed corresponding to the same paddle rotating in the same direction while the rods corresponding to the same head of the device rotating in the opposite direction. Suitable arms (4), a carriage (5) and a guiding staff (6) prevent non-conforming motions of the bars (3) and the paddles (1) during the working phase of the same where they present a rectilinear motion and are placed in reciprocal contact.

6 Claims, 4 Drawing Sheets

DEVICE FOR SEALING ENVELOPES MADE OF PLASTIC

The present invention relates to devices capable of sealing envelopes made of plastic material or the like, and more specifically to devices being used on continuous horizontal packaging machines.

The known devices of this type comprise particularly two superimposed shafts arranged with parallel axes and rotating in opposite directions, one of which has at least one paddle capable of achieving the sealing of the transversal borders of an envelope made of plastic material, plastified paper or the like. Very frequently one of the two paddles comprises a knife capable of carrying out the cutting of the material which is in the form of a band, which wound around the article, forms the envelopes in such a manner as to separate one from the other.

In the case in which the material being used for packaging is of the type which may be sealed under the action of heat, such as polyethylene, one or more electric resistors are disposed within the paddles so that when the paddles are subjected to the action of the electric current, they provide for heating the working surface of the paddles. The main drawback of the devices discussed hereinabove, resides in the fact that the two paddles remain in contact for an angular path which is very limited. Further, for the purpose of obtaining an acceptable quality of the sealing, it is necessary to reduce the velocity of rotation of the paddles for the purpose of increasing the time of reciprocal contact between the paddles themselves, a fact which clearly causes a reduction in the efficiency of the packaging machine. For the purpose of obviating this drawback, a device has been used in which the paddles do not carry out a circular course around the axis of the shaft which causes the paddles to rotate, but in which they carry out a linear run corresponding to the working phase while the path remains circular in the phase in which the paddles are not in reciprocal contact. This is achieved by means of one or two rollers which are pivoted at the extremeties of the bars which support the paddles. The rollers cover a cam path with a radius which varies with respect to the axis of the shaft which places the paddle in rotation. In this manner it is evident that the distance from the working surface of the paddle to the axis of the shaft mentioned hereinabove varies and in particular, it is the least corresponding to the linear part in which an effective sealing action is carried out by the paddles. In order to provide this variation in the radius, a particular means of connection between the paddles and the shafts which put the paddles in rotation has been used.

It should be noted that the presence of the rollers mentioned hereinabove which are indispensable in order to avoid any non-conforming motions of the paddles, and therefore, of the bars during the linear phase of motion, places a very precise limit to the value of the sealing pressure applicable onto the paddles. Further, the presence of two parallel shafts disposed obviously in a transversal direction with respect to the direction of advancement of the articles causes a very precise limit to the thickness of the packaging material which may be worked.

In addition to the foregoing, the device mentioned hereinabove presents some significant drawbacks in the case in which it is utilized for sealing under heat envelopes made of plastic material. In this case it is necessary to provide either conductors for electric connections for feeding the current to the resistors located within the paddles, as well as conductors for the connections between the probes capable of determining the temperature of the same paddles and the gearbox used for controlling the temperature. In this type of a device the conductors are brought in correspondence with the shafts which determine the rotation of the paddles and from there they are brought to a fixed part of the apparatus. It is evident that the conductors of connection between the paddles and the shaft undergo significant stresses due to the fact that the distance between the paddle and the axis of the shaft is not constant. Due to this fact the conductors cannot be made of copper, particularly, the conductors which carry the electric current, and cannot be made of any material having a low temperature coefficient, such as manganin and iron-constantan, particularly the conductors which connect with the probes because these materials cannot resist for any prolonged period of time such stresses. For this reason the core of the same conductors must be made in general of a steel which offers some excellent properties from the mechanical point of view, but which presents a resistance which is greater than the resistance of copper and particularly a high temperature coefficient, a fact which causes a significant lack of accuracy with respect to the determination of the temperature by the probes usually provided for this purpose.

The present invention provides a device in which the paddles perform a linear and non-curved motion in the portion corresponding to the working zone and which is capable of eliminating the drawbacks mentioned hereinabove.

In the device according to the present invention, the supporting bar of each of the two paddles is located in the area corresponding to the two extremeties in a cam path which presents a rectilinear sector corresponding to the working zone, as well as a sector of circular shape. One essential feature of the present invention is to provide that the bars mentioned hereinabove in the area corresponding to the area close to their extremeties are located within a slot formed in a rod which is placed in rotation by suitable means. In this manner the bar and the paddle connected with it are compelled to follow the movement of the rod so that they move along the cam path mentioned hereinabove. In order to avoid that the bar and consequently the paddle perform any non-conforming motions in the zone in which the motion is rectilinear, the bar mentioned hereinabove is fixed in the device according to the present invention, to a pair of arms which are disposed perpendicularly with respect to the bar itself. The arms are pivoted corresponding to the opposite extremity to a carriage which slides along a guiding staff horizontally arranged. This carriage performs a motion in an alternating direction along the same staff corresponding to the motion of the paddle along the cam path.

In view of the fact that the two connecting rods are not connected by any shaft, nor by any transversal means of connection, the kinematic connection is made possible by means which are external with respect to the working zone. With this type of device it is possible to operate under equal conditions of dimensions and shape of the cams, as well as the paddles on wrappings of thickness substantially greater with respect to the devices known in the art. In addition, the sealing pressure which is exerted by the paddles corresponding to the transversal limbs of each wrapping may be substantially increased because the rollers previously provided as stabilizing elements of the paddles corresponding to the rectilinear sector are no longer used. Finally, in view of the presence of the guiding staffs, it is convenient to place the conductors for the electric feeding of the resistors incorporated in the paddles, as well as the conductors which connect with the probes present in the same paddles, within conductors fixed to the same staffs, a fact which permits to avoid the stresses resulting from the fatigue of the same conductors.

This and other features of the present invention will be described in more detail hereinbelow by reference to the drawings of which:

Figure 1:
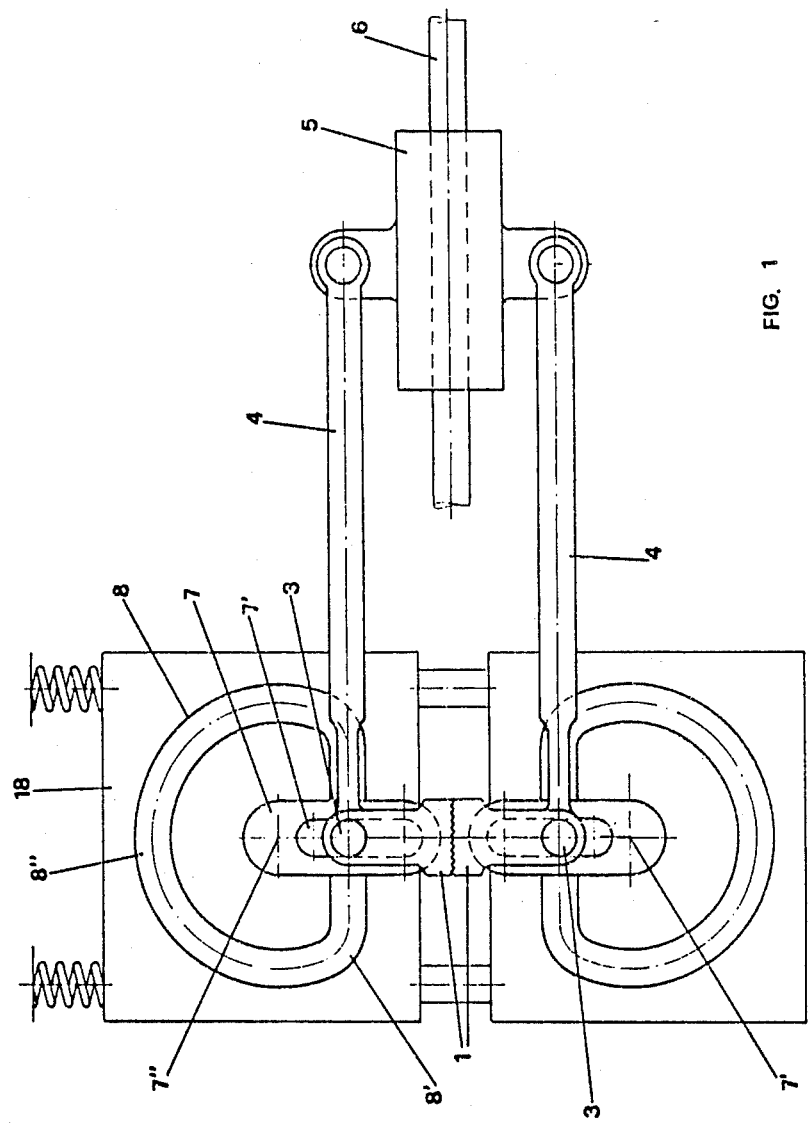
FIG. 1 is a schematic side view of the device of the present invention with the paddles in working position.

FIG. 1 shows that the device of the present invention comprises essentially a pair of paddles 1 opposite one to the other, each one of them being fixed to a supporting bar 3 which in proximity of both extremeties is inserted within a slot 7', the latter being formed longitudinally in the connecting rod 7. The extremeties of the bars are inserted in a cam path 8 which is formed along the surface turned towards the working zone of support 18. This cam path presents a rectilinear sector 8' disposed corresponding to the working zone, as well as sector 8", having the shape of a circumferential arc. In view of the fact that the connecting rods 7 are placed in rotation by suitable means around the transversal axis 7", it is clear that the supporting bar 3, and therefore the paddles 1 are compelled to follow the path determined by the cam path 8 where suitable rolling means disposed corresponding to the extremeties of bars 3 are located. The presence of the slot 7' permits the variation of the radius acquired by the axis of bar 3 with respect to the axis of rotation 7" due to the eccentricity of cam path 8.

Figure 2:
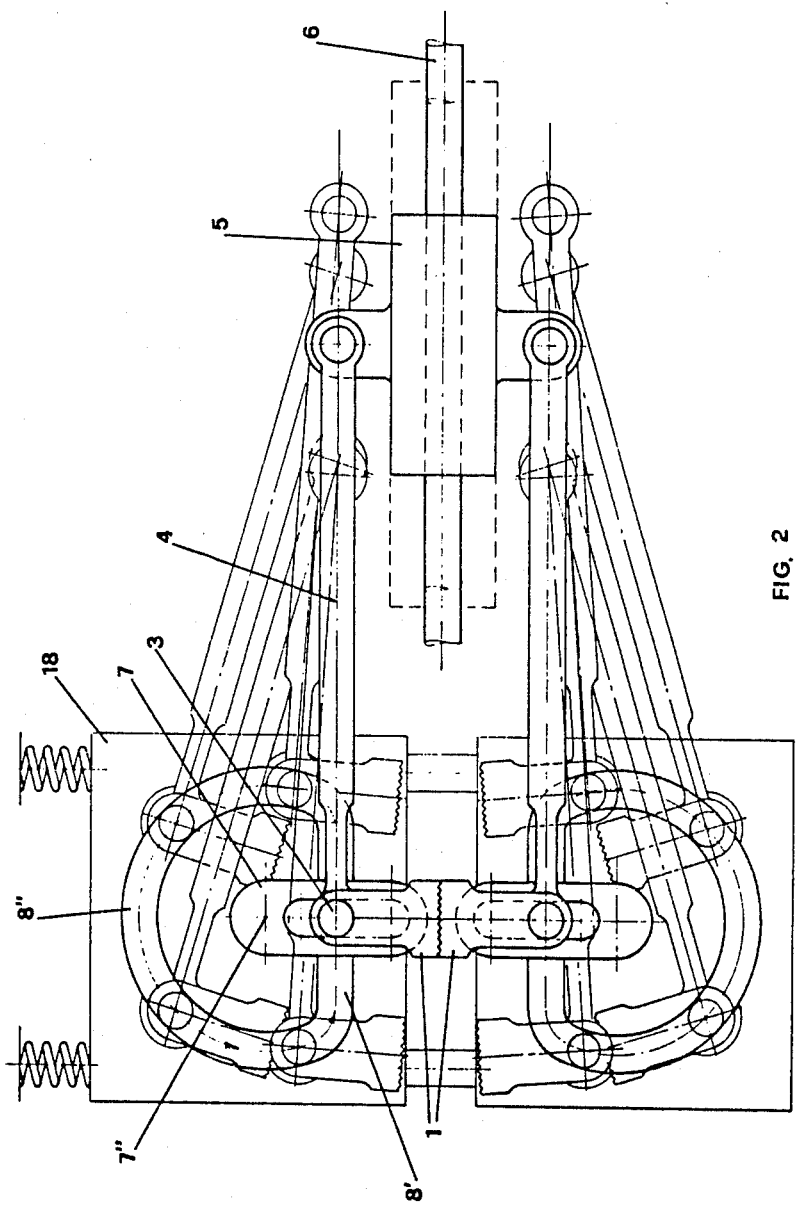
FIG. 2 is the same view with the paddles placed in various positions of the cam path.

FIG. 2 shows a series of positions acquired by the paddles during the rotation of the connecting rod 7. It is evident that the latter must rotate in a synchronous manner and in the opposite direction. The directions of rotation indicated in the figure are given by way of example and can be inverted with no problem.

The useful run of the paddles is delimited by the rectilinear sector 8' where they remain in contact, at first along a limited portion of their opposite faces, and therefore, along the total extension of the same, and therefore for a portion of the same which is always less up to their reciprocal separation, thus ensuring the sealing of the packages and eventually the cutting of the transversal borders of the packages.

In order to avoid that the paddles present motions which are non-conforming corresponding to the rectilinear sector 8', it is provided that a pair of arms 4 be fixed to each of the paddles, always corresponding to both their extremities with an axis perpendicular with respect to the transversal plane of symmetry of the paddles, said arms being pivoted, corresponding to their opposite extremity to a carriage 5 which slides along the guiding staff 6 disposed horizontally in relation to the motions determined along the entire complex by the rods 7.

Figure 4:
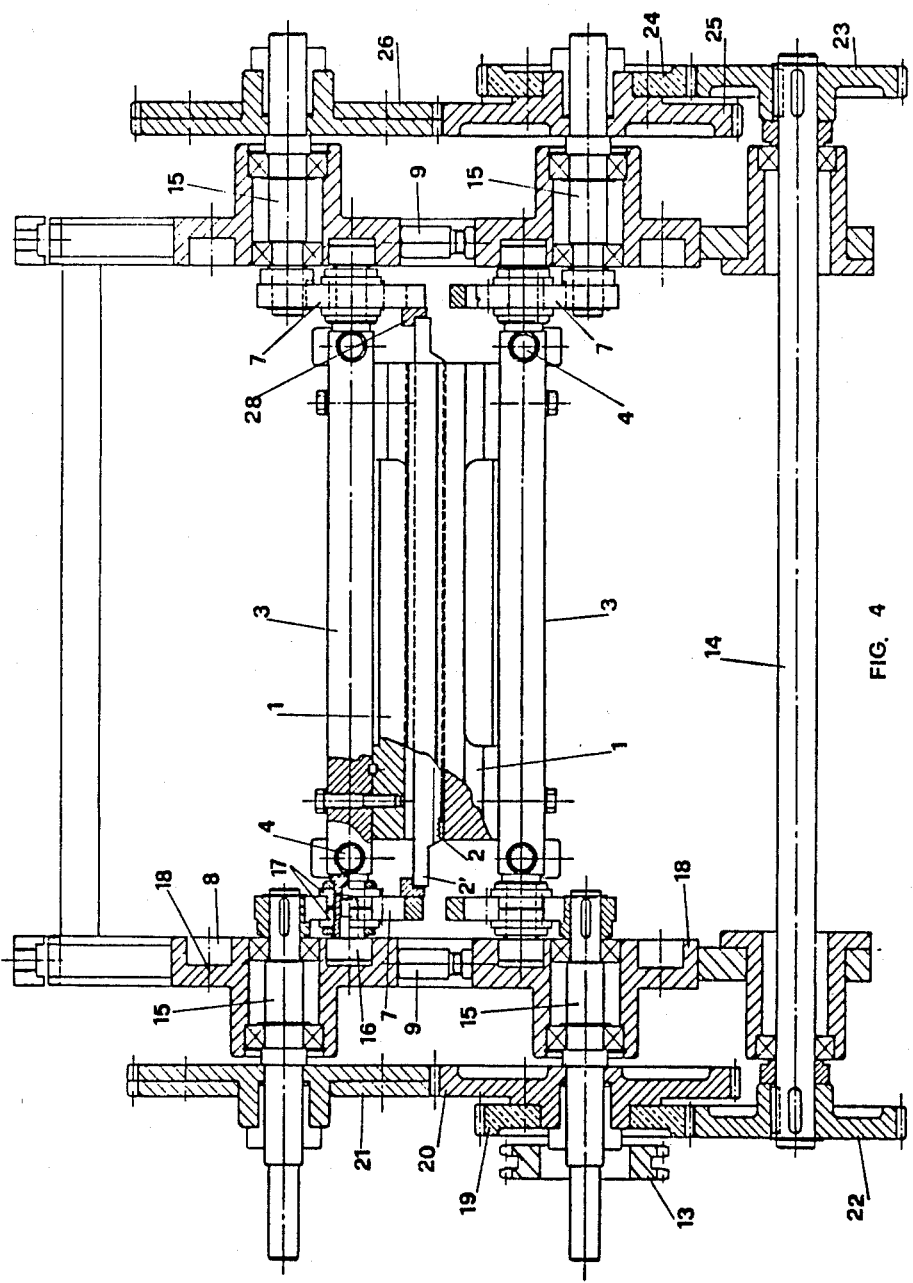
FIG. 4 is a detailed front view also in cross-section of the device of the present invention.

FIG. 4 shows that the terminal portions of bars 3 present transversal dimensions which are smaller than the center part, with roller bearings 16 which constitute the elements capable of rotating within the cam path 8 being placed around the terminal portions of the bars.

Figure 3:
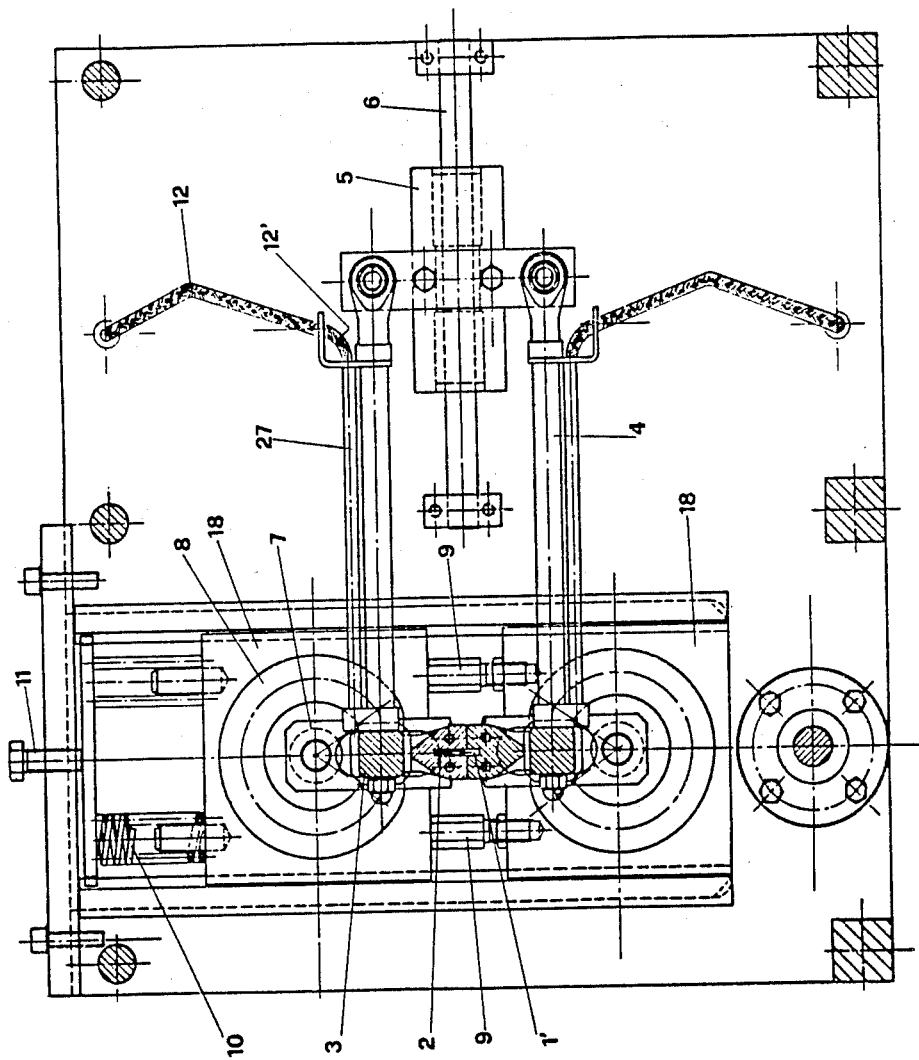
FIG. 3 is a detailed view in transversal section of the device of the present invention.

Around the bars 3 immediately in front of the terminal portions are placed two bushings 17 which are necessary to allow the motion of the bar within the slot present in the rod 7. FIG. 3 shows that the device is provided with elastic means 10 which push the upper support 18 downwardly, these elastic means being capable of applying a corresponding pressure by the upper paddle on the lower paddle, this pressure being regulable by means of screw 11. The two supports 18 of the same head are connected by means of spacers 9 which are interposed between the same, the spacers being capable of regulating also the distance between the paddles.

According to a specific embodiment of the invention, the entire complex is placed in motion by a motor not shown in the figure, connected by means of a chain or belt or similar device to a sprocket wheel 13, which is geared on one of the shafts 15, the latter placing in rotation one of the rods 7 located in one of the heads of the device. The rotation of the shaft determines the rotation of the sprocket wheels 19 and 20. The latter determine by means of sprocket wheel 21 the motion of the shaft 15 which places in rotation the other rod 7 located in the same head. The sprocket wheel 19 is connected to the sprocket wheel 22 which is keyed to the shaft 14, the latter being disposed transversely, and transmitting the motion to the other head of the device. On the other end of the same shaft 14 is keyed another sprocket wheel 23 which by means of sprocket wheel 24 places in rotation the shaft 15 of the rod located in the lower part in this head and which by means of sprocket wheels 25 and 26 determines the rotation of the shaft 15, the latter placing the other rod 7 located in this head in rotation. It is obvious that due to the connection between the gears of the sprocket wheels and due to the fact that the sprocket wheels corresponding to the two heads are identical, as well as due to the fact that the sprocket wheels 20 and 21 as well as 25 and 26 have the same number of teeth, the result is that the rods of the same head rotate synchronously in the opposite direction while the rods which correspond to the same paddle rotate synchronously but in the same direction. FIG. 3 shows that in the case in which the device is used for sealing by application of heat, the conductors of the resistors as well as the conductors for the transmission of the electric signal emanating from the probe located within the paddles, are advantageously located within a conduit 27 which is fixed to the arm 4, the latter being fixed to bar 3.

It is evident, therefore, that with this construction the conductors 12 and in particular their loop 12' are subjected to a stress resulting only from the motion of the arm 4, while with the known device, these conductors are located between the paddles and the shaft which places the same paddles in rotation and are subjected to much greater stresses in connection with the motion of the same paddles.

The device according to the present invention may also be adapted to carrying out the cutting operation corresponding to the limbs in the transversal extremities of two packages in sequence. In this case the knife is located within a suitable cavity formed on the working surface of one of the two paddles 1 while there is provided another cavity 1' on the opposite paddles, for the purpose of providing that the blade of the knife sink in the same cavity when the cutting operation is to be carried out. This knife is going to be fixed by any conventional means on the bottom of the cavity which contains the knife by means of elastic means which have a tendency to cause the knife to return towards the interior of the cavity. For the purpose of determining the cutting action of knife 2, corresponding to the time in which the paddles are in contact, the present invention provides that the knife project laterally from the cavity in which it is located by means of projections 2' while it is provided that two blocks 28 are fixed onto the extremity of rods 7 relative to the paddle in which the knife is located. In view of the fact that the rod 7 rotates according to a path which is rigorously circular around the axis of the shaft 15 while the paddles 1 follow an eccentric course, the extremities 2' of the knife are caused to interfere with the blocks 28, a fact which causes the knife to come out from the cavity in which it is located with consequent cutting of the envelope.

What is claimed is:

1. A device for sealing envelopes made of plastic material which comprises a pair of heads, two paddles (1) having parallel axes and rotating synchronously in opposite directions, a cam plate (8) being located on each of the heads of the device corresponding to both said paddles, means connected to said paddles sliding within said cam plates, whereby said paddles are adapted to carry out an eccentric path, said cam plates having a rectilinear section, both the extremities of said rectilinear section being joined by a portion having the shape of a circumferential sector, a support bar (3) to which each one of said paddles is fixed, a pair of rods (7) adapted to place in rotation each of said bars, each of said rods having a slot (7'), the portions close to the extremity of each of said bars being located within each of said slots in said rods (7), the ends of said bar (3) being located within said cam plate (8), said rods (7) rotating synchronously, the rods of each of the pairs placed in correspondence to each of said paddles rotating in a direction opposite to the direction of the other pair, a pair of arms (4) being fixed to each of said bars, each of said arms (4) having an axis perpendicular with respect to the transversal central plane of the paddles, said arms being pivoted on a carriage (5), said carriage sliding along a guiding staff (6) horizontally arranged.

2. The device according to claim 1 wherein rolling means (16) are located corresponding to each of said bars (3), said rolling means (16) being adapted to slide in said cam plate (8).

3. The device according to claim 1 wherein two bushings (17) are located around said bars (3) placed within the slots (7') of rods (7).

4. The device according to claim 1 wherein the motion of the device is provided by a motor connected to a sprocket wheel (13) keyed on a shaft (15) which places in rotation each of said rods, a second pair of sprocket wheels (19, 20) being keyed on said shaft, said second pair of sprocket wheels placing in rotation a third sprocket wheel (21) of equal diameter, said third sprocket wheel being keyed on said shaft (15) which places the second rod (7) located in said head in rotation, said sprocket wheel (19) causing by means of a fourth sprocket wheel (22) the rotation of a second shaft (14), said shaft (14) being located transversely outside of the working zone of said device, said shaft (14) by means of a kinematic chain of sprocket wheels (23, 24, 25 and 26) equal and identically disposed with respect to said sprocket wheels placed correspondingly to the second head of the device, causes rotation of said shafts (15) and consequently said rods (7) fixed thereto.

5. A device according to claim 1 for sealing envelopes by heat which comprises probes located in said paddles, and corresponding to each of arms (4) a conduit (27) adapted to contain conductors (12) capable of feeding electricity to the resistors placed within said paddles (1) and feeding electricity to the resistors connected with said probes.

6. A device according to claim 1 which comprises a knife (2) located in a suitable first cavity for cutting the transversal borders of said envelopes, said cavity extending along the length of one of said paddles, said knife being fixed at the bottom of same cavity through elastic means, said elastic means causing return of said knife within the said cavity, a second cavity (1') being formed on the paddle opposite to said paddle wherein the knife is located, corresponding to said first cavity, wherein said knife (2) has two lateral projections 2', said projections extending laterally outside of said paddle (1) and said device comprises block (28) along said rods (7) corresponding to said paddle in which said knife is located, said block having dimensions suitable to engage with the extremity (2') of said knife (2), causing said knife to move downwardly when said paddle (1) is in the rectilinear phase of motion.

* * * * *